(12) United States Patent
Kamo et al.

(10) Patent No.: US 7,932,315 B2
(45) Date of Patent: Apr. 26, 2011

(54) INNER PART OF HARD DISK DRIVE

(75) Inventors: Hiroshi Kamo, Tokyo (JP); Yukihiro Ban, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 587 days.

(21) Appl. No.: 11/792,492

(22) PCT Filed: Jan. 6, 2006

(86) PCT No.: PCT/JP2006/300062
§ 371 (c)(1),
(2), (4) Date: Jun. 7, 2007

(87) PCT Pub. No.: WO2006/073168
PCT Pub. Date: Jul. 13, 2006

(65) Prior Publication Data
US 2007/0290391 A1    Dec. 20, 2007

(30) Foreign Application Priority Data
Jan. 7, 2005    (JP) .................................. 2005-002536

(51) Int. Cl.
*C08G 18/42* (2006.01)
(52) U.S. Cl. ........................ 524/500; 524/539; 524/540
(58) Field of Classification Search .................. 524/500, 524/539, 540
See application file for complete search history.

(56) References Cited

U.S. PATENT DOCUMENTS

| | | |
|---|---|---|
| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,929,930 A | 12/1975 | Izawa et al. |
| 4,011,200 A | 3/1977 | Yonemitsu et al. |
| 4,777,201 A | 10/1988 | Shigemoto et al. |
| 5,286,330 A | 2/1994 | Azuma et al. |
| 6,046,300 A | 4/2000 | Umetsu et al. |
| 6,441,074 B1 | 8/2002 | Soelch |
| 2001/0031706 A1 | 10/2001 | Uchida et al. |
| 2002/0193533 A1 | 12/2002 | Kamo et al. |
| 2005/0054763 A1 | 3/2005 | Kobayashi |
| 2005/0088782 A1 | 4/2005 | Horio et al. |
| 2007/0003763 A1* | 1/2007 | Kamo et al. ............... 428/411.1 |

FOREIGN PATENT DOCUMENTS

| | | |
|---|---|---|
| CN | 1336944 A | 2/2002 |
| EP | 0 480 766 A1 | 4/1992 |
| JP | 50-51197 | 5/1975 |
| JP | 52-17880 | 2/1977 |
| JP | 63-152628 | 6/1988 |
| JP | 3-49925 A | 3/1991 |
| JP | 03-73588 | 3/1991 |
| JP | 3-280271 | 12/1991 |
| JP | 6-316032 | 11/1994 |
| JP | 8-59965 | 3/1996 |
| JP | 9-251733 A | 9/1997 |
| JP | 11-263829 | 9/1999 |
| JP | 11-349703 | 12/1999 |
| JP | 2000-38461 | 2/2000 |
| JP | 2000-263724 | 9/2000 |
| JP | 2000-272055 | 10/2000 |
| JP | 2001-233968 | 8/2001 |
| JP | 2001-246635 | 9/2001 |
| JP | 2001-310422 | 11/2001 |
| JP | 2001-335646 | 12/2001 |
| JP | 2002-241515 | 8/2002 |
| JP | 2002-241601 | 8/2002 |
| JP | 2002-275276 | 9/2002 |
| JP | 2003-1772 | 1/2003 |
| JP | 2003-12829 | 1/2003 |
| JP | 2003-53896 | 2/2003 |
| JP | 2003-073468 | 3/2003 |
| JP | 2003-73468 A | 3/2003 |
| JP | 2003-73560 | 3/2003 |
| JP | 2003-82244 | 3/2003 |
| JP | 2003-82245 | 3/2003 |
| JP | 2003-236870 | 8/2003 |
| JP | 2003-246019 | 9/2003 |
| JP | 2003-276139 | 9/2003 |
| JP | 2003-313313 | 11/2003 |
| JP | 2003-335871 | 11/2003 |
| JP | 2004-40895 A | 2/2004 |
| JP | 2004-51688 | 2/2004 |
| JP | 2004-75881 | 3/2004 |
| JP | 2005-255941 | 9/2005 |
| JP | 2005-290328 | 10/2005 |
| WO | WO 00/40655 | 7/2000 |
| WO | WO 03/055945 A1 | 7/2003 |

* cited by examiner

*Primary Examiner* — Edward J Cain
(74) *Attorney, Agent, or Firm* — Finnegan, Henderson, Farabow, Garrett & Dunner, L.L.P.

(57) ABSTRACT

A hard disk drive inner part formed of a resin which exhibits well-balanced low outgassing properties, ultrasonic cleaning resistance, low ionic contamination properties, low particulate contamination properties, repeated removability, heat resistance, specific gravity, and water-absorbing properties. The hard disk drive inner part includes a resin composition which includes a polyphenylene ether resin (A).

15 Claims, 3 Drawing Sheets

INNER PART OF HARD DISK DRIVE

TECHNICAL FIELD

The present invention relates to a hard disk drive inner part including a polyphenylene ether resin that exhibits excellent low outgassing properties, ultrasonic cleaning resistance, low ionic contamination properties, low particulate contamination properties, repeated removability, heat resistance, specific gravity, and water-absorbing properties.

BACKGROUND ART

Along with development of digital home appliances such as personal computers, DVD drive recorders with a built-in hard disk drive, digital video cameras, portable digital music players, and portable telephones, hard disk drives (HDD) have been increasingly made smaller from 3.5 inches to 2.5 inches, 1.8 inches, 1.0 inch, and 0.85 inches, while their capacity has been increased. Therefore, there has been a strong demand for hard disk drive inner parts formed of a resin from the standpoint of a reduction in size and cost. For example, use of a polyoxymethylene resin (see WO03/055945, for example) or a polyphenylene sulfide resin (see JP-A-2003-335871, for example) has been proposed as a ramp material which is required to exhibit sliding properties with a metal.

These materials exhibit improved sliding properties, but exhibit insufficiently low outgassing properties. Low outgassing properties are very important properties for hard disk drive inner parts. Since the hard disk placement space has been reduced along with a trend toward a reduction in size, hard disk drive inner parts have been sought which exhibit more excellent low outgassing properties.

Examples of parts for which sliding properties are not required to a large extent that can be given are, a bracket, a latch, a comb, a spoiler, a bush, a mounting plate, a hook, and the like. A polyetherimide, a liquid crystal polyester, and a polycarbonate have been used for most of these parts. However, these materials do not exhibit a sufficient balance between low outgassing properties, cleanliness (absence of silicon, halogen, sulfur, and the like), cost, specific gravity, and water-absorbing properties.

Therefore, there has been a strong demand for hard disk drive inner parts formed of a resin that exhibit excellent low outgassing properties, are not contaminated with particulate and ions, and exhibit well-balanced heat resistance, cost, specific gravity, and water-absorbing properties.

A method has been proposed which improves the heat resistance and mechanical properties by alloying a polyphenylene ether resin with a liquid crystal polyester (see JP-A-2003-073560, for example). However, the document is silent about hard disk drive inner parts and outgassing properties.

A resin composition containing polyphenylene sulfide (PPS) and a polyphenylene ether (PPE) has been proposed for a hard disk drive arm or a hard disk drive carriage as optical parts (see JP-A-2004-75881, for example). However, the polyphenylene ether contained in the resin composition is a modified polyphenylene ether. Moreover, the document is silent about residual volatile components, low outgassing properties, and repeated removability.

A resin composition containing a polyester thermotropic liquid crystal polymer and inorganic particles has been proposed for hard disk drive centering hub parts (see JP-A-8-59965, for example). However, the document does not disclose a specific polyphenylene ether alloy and is silent about residual volatile components, low outgassing properties, low ionic contamination properties, and repeated removability.

A resin composition has been proposed which contains an alloy of polyethylene terephthalate (PET) or a polyamide with a liquid crystal polymer (see JP-A-11-263829, for example). However, the document does not disclose a specific polyphenylene ether alloy. Moreover, the document merely refers to HDD components and does not disclose specific HDD inner parts, residual volatile components, low outgassing properties, low ionic contamination properties, and repeated removability of a polyphenylene ether.

A thermoplastic resin has been proposed for antistatic members for disks and magnetic heads of hard disk drives (see JP-A-2002-275276, for example). However, the document substantially discloses a polycarbonate resin and does not disclose a specific polyphenylene ether alloy. Moreover, the document is silent about residual volatile components, low outgassing properties, low ionic contamination properties, and repeated removability.

Use of a modified polyphenylene ether for a base (housing) of hard disk drives has been proposed (see JP-A-3-280271, for example). However, the document does not disclose residual volatile components of the polyphenylene ether, low outgassing properties, low ionic contamination properties, and repeated removability.

Use of a composition containing a crystalline resin and an amorphous resin has been proposed for a transfer tray or a housing for hard disk drive parts (see JP-A-2005-290328, for example). However, the document does not disclose a specific polyphenylene ether composition and is silent about residual volatile components of the polyphenylene ether, low outgassing properties, low ionic contamination properties, and repeated removability.

DISCLOSURE OF THE INVENTION

Problems to be Solved by the Invention

An object of the present invention is to provide a hard disk drive inner part formed of a resin that exhibits well-balanced low outgassing properties, ultrasonic cleaning resistance, low ionic contamination properties, low particulate contamination properties, repeated removability, heat resistance, specific gravity, and water-absorbing properties.

Means for Solving the Problems

The inventors of the present invention have conducted extensive studies on the technology which achieves the above object. As a result, the inventors have found that a hard disk drive inner part obtained by molding a resin composition including a polyphenylene ether resin exhibits well-balanced low outgassing properties, ultrasonic cleaning resistance, low ionic contamination properties, low particulate contamination properties, repeated removability, heat resistance, specific gravity, and water-absorbing properties. This finding has led to the completion of the present invention.

Specifically the present invention provides:

[1] A hard disk drive inner part comprising a resin composition which comprises a polyphenylene ether resin (A);

[2] The hard disk drive inner part according to [1], wherein, when the polyphenylene ether resin (A) includes an aromatic vinyl polymer, the polyphenylene ether resin (A) has a content of the aromatic vinyl polymer of less than 70 parts by mass;

[3] The hard disk drive inner part according to [1] or [2], wherein the resin composition which comprises the polyphenylene ether resin (A) contains residual volatile components including a polyphenylene ether polymerization solvent and/or a styrene monomer in an amount of less than 3000 ppm;

[4] The hard disk drive inner part according to any one of [1] to [3], wherein the resin composition comprises from 51 to 99.5 parts by mass of the polyphenylene ether resin (A) and from 0.5 to 49 parts by mass of a liquid crystal polyester (B);

[5] The hard disk drive inner part according to [4], wherein the resin composition further comprises from 0.1 to 10 parts by mass of a compound (C) containing Zn and/or Mg based on 100 parts by mass of components (A) and (B) in total;

[6] The hard disk drive inner part according to any one of [1] to [5], wherein the hard disk drive inner part includes a removable portion;

[7] The hard disk drive inner part according to any one of [1] to [6], wherein the hard disk drive inner part is a mounting plate or a hook;

[8] A resin composition for hard disk drive inner parts comprising a polyphenylene ether resin (A);

[9] The resin composition according to [8], wherein, when the polyphenylene ether resin (A) includes an aromatic vinyl polymer, the polyphenylene ether resin (A) has a content of the aromatic vinyl polymer of less than 70 parts by mass;

[10] The resin composition according to [8] or [9], wherein the resin composition contains residual volatile components including a polyphenylene ether polymerization solvent and/or a styrene monomer in an amount of less than 3000 ppm;

[11] The resin composition according to any one of [8] to [10], comprising from 51 to 99.5 parts by mass of the polyphenylene ether resin (A) and from 0.5 to 49 parts by mass of a liquid crystal polyester (B);

[12] The resin composition according to [11], further comprising from 0.1 to 10 parts by mass of a compound (C) containing Zn and/or Mg based on 100 parts by mass of components (A) and (B) in total;

[13] A method for producing a resin composition as a raw material for hard disk drive inner parts, the method comprising:

melt-mixing in a mixing zone at least one or more components selected from (A) a polyphenylene ether resin, (B) a liquid crystal polyester, and (C) a compound containing Zn and/or Mg using an extruder, at least one or more vents being provided in the mixing zone;

removing volatile components through the vent in a first stage at a degree of vacuum of −40 kPa or less; and adjusting an oxygen concentration to 5% or less by injecting an inert gas through a feed port;

[14] The method according to [13], wherein the extruder has a barrel inner diameter of 46 mm or more;

[15] The method according to [14], wherein the extruder has an L/D ratio (L: length of a screw of the extruder, D: inner diameter of a barrel of the extruder) of 30 to 100;

[16] A hard disk drive inner part obtained by molding a resin composition produced by the method according to any one of [13] to [15];

[17] A method for molding a hard disk drive inner part comprising injection-molding the resin composition according to any one of [8] to [12] at a mold temperature of 130° C. or more and a resin temperature of 350° C. or less; and

[18] A hard disk drive inner part obtained by the method according to [17].

The present invention has been achieved based on the idea of using a resin composition including a polyphenylene ether resin for a hard disk drive inner part as a new application. Accordingly, the present invention provides:

[19] Use of a resin composition which comprises a polyphenylene ether resin (A) for production of hard disk drive inner parts;

[20] The use according to [19], wherein, when the polyphenylene ether resin (A) includes an aromatic vinyl polymer, the polyphenylene ether resin (A) has a content of the aromatic vinyl polymer of less than 70 parts by mass;

[21] The use according to [19] or [20], wherein the resin composition including the polyphenylene ether resin (A) contains residual volatile components including a polyphenylene ether polymerization solvent and/or a styrene monomer in an amount of less than 3000 ppm;

[22] The use according to any one of [19] to [21], wherein the resin composition comprises from 51 to 99.5 parts by mass of the polyphenylene ether resin (A) and from 0.5 to 49 parts by mass of a liquid crystal polyester (B); and

[23] The use according to [22], wherein the resin composition further comprises from 0.1 to 10 parts by mass of a compound (C) containing Zn and/or Mg for 100 parts by mass of components (A) and (B) in total.

Effect of the Invention

According to the present invention, a hard disk drive inner part formed of the resin composition can be provided that exhibits well-balanced low outgassing properties, ultrasonic cleaning resistance, low ionic contamination properties, low particulate contamination properties, repeated removability, heat resistance, specific gravity, and water-absorbing properties.

BEST MODE FOR CARRYING OUT THE INVENTION

The present invention is described in detail below.

The polyphenylene ether resin (A) used in the present invention is a homopolymer and/or a copolymer including a repeating unit of the following formula 1 and having a reduced viscosity (0.5 g/dl, chloroform solution, measured at 30° C.) of 0.15 to 1.0 dl/g. The reduced viscosity is more preferably 0.20 to 0.70 dl/g, and still more preferably 0.40 to 0.60 dl/g.

[Formula 1]

$R_1$ and $R_4$ individually represent hydrogen, a primary or secondary lower alkyl, phenyl, an aminoalkyl, or hydrocarbonoxy. $R_2$ and $R_3$ individually represent hydrogen, a primary or secondary lower alkyl, or phenyl.

Specific examples of a polyphenylene ether resin that can be given, are poly(2,6-dimethyl-1,4-phenylene ether), poly (2-methyl-6-ethyl-1,4-phenylene ether), poly(2-methyl-6-phenyl-1,4-phenylene ether), poly(2,6-dichloro-1,4-phenylene ether), and the like. Further specific examples include polyphenylene ether copolymers such as a copolymer of 2,6-dimethylphenol and another phenol (e.g., 2,3,6-trimethylphenol or 2-methyl-6-butylphenol). Of these, poly(2,6-dimethyl-1,4-phenylene ether) and a copolymer of 2,6-dimethylphenol and 2,3,6-trimethylphenol are preferred. Poly(2,6-dimethyl-1,4-phenylene ether) is especially preferred.

An example of a method for producing the polyphenylene ether resin (A) used in the present invention that can be given, is a method disclosed in U.S. Pat. No. 3,306,874 which subjects 2,6-xylenol to oxidation polymerization using a cuprous salt-amine complex as a catalyst. Methods disclosed in U.S. Pat. No. 3,306,875, U.S. Pat. No. 3,257,357, U.S. Pat. No. 3,257,358, JP-B-52-17880, JP-A-50-51197, and JP-A-63-152628 are also preferred as a method for producing the polyphenylene ether resin (A).

The polyphenylene ether resin (A) according to the present invention may be used in a powder form obtained after polymerization, or may be formed into pellets by melt-mixing the polyphenylene ether resin using an extruder or the like in a nitrogen gas atmosphere or an atmosphere other than nitrogen gas with or without devolatilization.

The polyphenylene ether resin (A) according to the present invention also includes polyphenylene ether functionalized with a dienophile compound. Examples of a dienophile compound that can be given, are compounds such as maleic anhydride, maleic acid, fumaric acid, phenylmaleimide, itaconic acid, acrylic acid, methacrylic acid, methyl arylate, methyl methacrylate, glycidyl acrylate, glycidyl methacrylate, stearyl acrylate, and styrene. As a method for functionalizing the polyphenylene ether with the dienophile compound, the polyphenylene ether may be functionalized in a melted state using an extruder or the like in the presence or absence of a radical generator with or without devolatilization. The polyphenylene ether may be functionalized in an unmelted state (i.e. at room temperature or higher and at the melting point or less) in the presence or absence of a radical generator. The melting point of the polyphenylene ether is defined as the peak top temperature of the peak observed in a temperature-heat flow graph when increasing the temperature at 20° C./minute in the measurement using a differential scanning calorimeter (DSC). When multiple peak top temperatures exist, the melting point of the polyphenylene ether is defined as the highest peak top temperature.

The polyphenylene ether resin (A) according to the present invention refers to a polyphenylene ether resin or a mixture of a polyphenylene ether resin and an aromatic vinyl polymer, and may further include other resins. Examples of an aromatic vinyl polymer that can be given, are atactic polystyrene, high-impact polystyrene, syndiotactic polystyrene, an acrylonitrile-styrene copolymer, and the like. When using a mixture of the polyphenylene ether resin and the aromatic vinyl polymer, the polyphenylene ether resin is used in an amount of 30 parts by mass or more, preferably 50 parts by mass or more, more preferably 70 parts by mass or more, and still more preferably 80 parts by mass or more based on the total amount of the polyphenylene ether resin and the aromatic vinyl polymer from the viewpoint of low outgassing properties and heat resistance. Specifically, the polyphenylene ether resin (A) contains the aromatic vinyl polymer in an amount of preferably less than 70 parts by mass, more preferably less than 50 parts by mass, even more preferably less than 30 parts by mass, and still more preferably less than 20 parts by mass. The lower limit is preferably 0.5 parts by mass or more from the viewpoint of flowability, although the lower limit is not particularly limited. In particular, an aromatic vinyl polymer obtained by anionic polymerization is preferably used from the viewpoint of thermal stability (i.e. residual volatile components).

Figure 1:
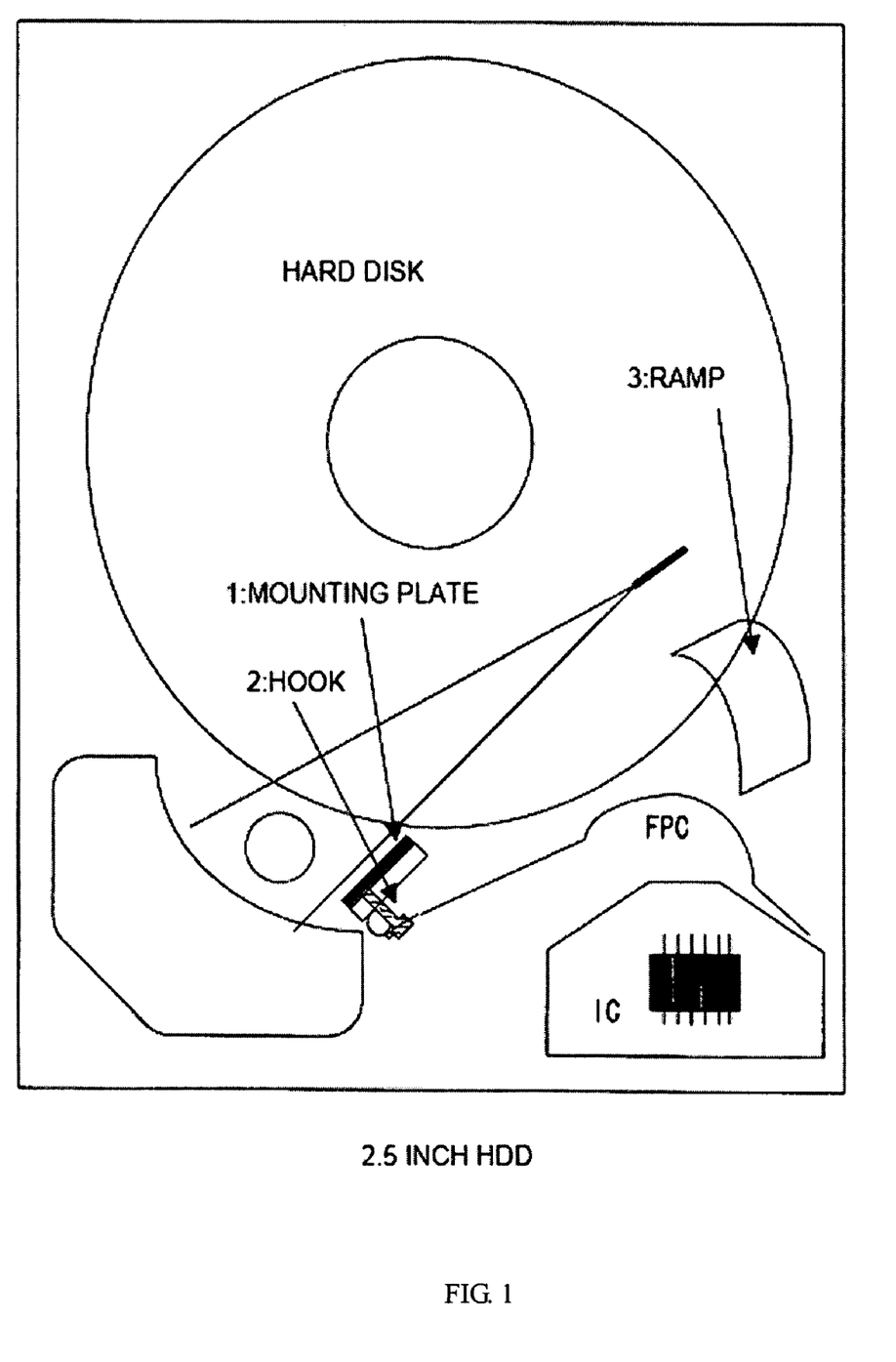
FIG. 1 is a schematic view of a 2.5 inch hard disk drive (HDD).
Figure 2:
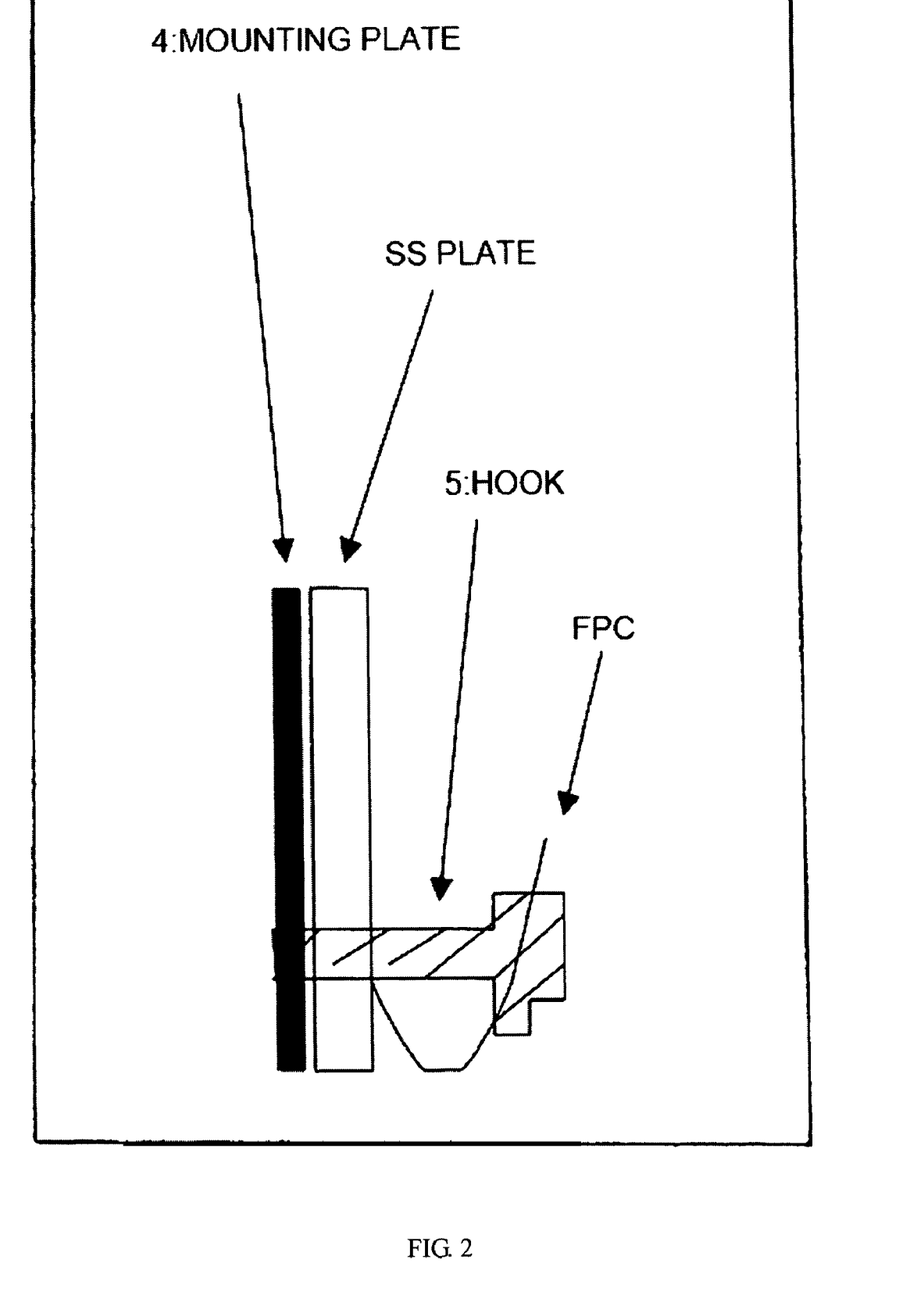
FIG. 2 is an enlarged view of a state in which a mounting plate and a hook are mounted. The mounting plate is in contact with an SS plate. The hook secures the mounting plate/SS plate and a flexible printed circuit (FPC).

The hard disk drive inner part according to the present invention is obtained by molding a resin composition including the polyphenylene ether resin (A). The hard disk drive inner part refers to resin parts mounted in a hard disk drive, as shown in FIG. 1. The hard disk drive inner part is selectively used depending on the respective function and the size and the design of the hard disk drive. Specific examples of a hard disk drive inner part that can be given, are a bracket, a latch, a comb, a spoiler, a bush, a mounting plate, a hook, a ramp, and the like. In particular, the hard disk drive inner part is suitable as a bracket, a latch, a comb, a spoiler, a bush, a mounting plate, or a hook for which sliding properties are not required. The hard disk drive inner part according to the present invention includes a removable portion. Examples of such a part that can be given, are a mounting plate, a hook, a blanket, and the like. The hard disk drive inner part is suitable as a part for which transparency is not required, such as a mounting plate, a hook, or a bracket. A mounting plate and a hook are more suitable. FIG. 2 is an enlarged view of a mounting plate and a hook. The mounting plate has the function of reinforcing the terminals of a flexible printed circuit (FPC) and the function of an insulating plate. The hook has the function of fitting and securing the mounting plate, a metal plate (generally a stainless steel plate), and the flexible printed circuit. The bracket is generally a plate in the shape of the letter L, and has the function of a base which supports an IC. These parts may be called by different names insofar as the parts have equivalent functions.

It is preferable that the resin composition including the polyphenylene ether resin (A) according to the present invention contain residual volatile components (including polyphenylene ether polymerization solvent and/or styrene monomer) in an amount of less than 3000 ppm. The amount of residual volatile components is preferably less than 3000 ppm, more preferably less than 2000 ppm, particularly preferably less than 1000 ppm, even more preferably less than 500 ppm, and still more preferably less than 250 ppm from the viewpoint of the low outgassing properties of the hard disk drive inner part. The amount of substance deposited at the end of a magnetic head is reduced by improving the low outgassing properties, whereby the operation reliability, stability, and operating life of the hard disk drive are improved. Therefore, low outgassing properties are very important properties for a hard disk drive inner part.

The term "residual volatile component" according to the present invention is a solvent component contained in the polyphenylene ether resin (A) and used when polymerizing the polyphenylene ether resin. When mixing an aromatic vinyl polymer or the like as described above, the resin composition may contain a decomposed product derived from the polystyrene resin due to heat or the like. Such a product also falls under the term "residual volatile component" according to the present invention. Specific examples of a residual solvent component that can be given, are ethylbenzene, o-xylene, m-xylene, p-xylene, and toluene. A specific example of a decomposed product derived from the polystyrene resin that can be given, is a styrene monomer. The residual volatile components may be quantitatively determined by analyzing the resin composition including the polyphenylene ether resin (A) by gas chromatography using an internal standard and creating the calibration curve. When the resin composition for molding a hard disk drive inner part according to the present invention includes a component (B), a component (C), and other components described later in addition to component (A), the amount of residual volatile components is a value obtained by quantitatively determining the residual volatile components including the polyphenylene ether polymerization solvent and/or the styrene monomer with respect to the total amount of the resin composition.

In the present invention, a hard disk drive inner part may be obtained by molding only the polyphenylene ether resin. However, it is preferable that the resin composition include a liquid crystal polyester (B) described below.

The liquid crystal polyester (B) according to the present invention is a polyester called a thermotropic liquid crystal polymer. As the liquid crystal polyester (B), a known thermotropic liquid crystal polyester may be used. Examples of a thermotropic liquid crystal polyester that can be given, are a thermotropic liquid crystal polyester containing p-hydroxybenzoic acid and polyethylene terephthalate as the major constituent units, a thermotropic liquid crystal polyester containing p-hydroxybenzoic acid and 2-hydroxy-6-naphthoic acid as the major constituent units, a thermotropic liquid crystal polyester containing p-hydroxybenzoic acid, 4,4'-dihydroxybiphenyl, and terephthalic acid as the major constituent units, and the like. The thermotropic liquid crystal polyester is not particularly limited. As the liquid crystal polyester (B) used in the present invention, a liquid crystal polyester containing the following structural unit (a) and/or (b) and optionally containing the following structural unit (c) and/or (d) is preferred.

[Formula 2]

(a)

[Formula 3]

(b)

[Formula 4]

(c)

[Formula 5]

(d)

The structural unit (a) is a polyester structural unit produced from p-hydroxybenzoic acid, and the structural unit (b) is a structural unit produced from 2-hydroxy-6-naphthoic acid, respectively. A thermoplastic resin composition according to the present invention exhibiting well-balanced mechanical properties such as heat resistance, flowability, and rigidity can be obtained by using the structural units (a) and (b). The Xs in the structural units (c) and (d) may be independently selected from the following formulas (2) either individually or in combination of two or more.

[Formula 6]

(2)

($n$: integer of 1 to 6) (Y: halogen, alkyl, or aryl)

In the structural unit (c), structural units produced from each of ethylene glycol, hydroquinone, 4,4'-dihydroxybiphenyl, 2,6-dihydroxynaphthalene, and bisphenol A are preferred. Of these, structural units respectively produced from ethylene glycol, 4,4'-dihydroxybiphenyl, and hydroquinone are preferred. Structural units produced from each of ethylene glycol and 4,4'-dihydroxybiphenyl is particularly preferred.

In the structural unit (d), structural units produced from each of terephthalic acid, isophthalic acid, and 2,6-dicarboxynaphthalene are preferred. Structural units produced from each of terephthalic acid and isophthalic acid being more preferred.

In the structural units (c) and (d), at least one of the above-mentioned structural units may be used, or two or more of the above-mentioned structural units may be used in combination. Specifically, when using two or more structural units in combination, 1) a combination of structural units produced from ethylene glycol and structural units produced from hydroquinone, 2) a combination of structural units produced from ethylene glycol and structural units produced from 4,4'-dihydroxybiphenyl, 3) a combination of structural units produced from hydroquinone and structural units produced from 4,4'-dihydroxybiphenyl, and the like can be given for the structural unit (c).

Regarding the structural unit (d), 1) a combination of structural units produced from terephthalic acid and structural units produced from isophthalic acid, 2) a combination of structural units produced from terephthalic acid and structural units produced from 2,6-dicarboxynaphthalene, and the like can be given. The amount of terephthalic acid is preferably 40 wt % or more, more preferably 60 wt % or more, and still more preferably 80 wt % or more of the total amount of the two components. If the amount of terephthalic acid is 40 wt % or more of the total amount of the two components, a resin composition exhibiting relatively excellent flowability and heat resistance is obtained. The ratio of the structural units (a), (b), (c), and (d) used in the liquid crystal polyester (B) is not particularly limited. Note that structural units (c) and (d) are almost equimolar.

The following structural unit (e) formed of structural units (c) and (d) may also be used as the structural unit in the component (B). Specific examples of a structural unit (e) that can be given, are 1) a structural unit produced from ethylene glycol and terephthalic acid, 2) a structural unit produced from hydroquinone and terephthalic acid, 3) a structural unit produced from 4,4'-dihydroxybiphenyl and terephthalic acid, 4) a structural unit produced from 4,4'-dihydroxybiphenyl and isoterephthalic acid, 5) a structural unit produced from bisphenol A and terephthalic acid, and the like.

[Formula 7]

(e)

Structural units produced from other aromatic dicarboxylic acids, aromatic diols, and aromatic hydroxycarboxylic acids may be optionally included in the liquid crystal polyester component (B) according to the present invention in such a small amount that the features and the effects of the present invention are not impaired.

The temperature (hereinafter called "liquid crystal starting temperature") at which the component (B) according to the present invention starts exhibiting a liquid crystal state during melting is preferably 150 to 350° C., and more preferably 180 to 320° C. It is preferable that the liquid crystal starting temperature be within the above range from the viewpoint of peeling after ultrasonic cleaning of the resulting molded product.

In the present invention, it is preferable that the resin composition include a compound (C) containing Zn and/or Mg. This compound is an inorganic compound or an organic compound containing a metal. The compound (C) according to the present invention is a compound intrinsically containing Zn and/or Mg as the major component. As the compound (C), oxides, hydroxides, aliphatic carboxylates, and acetates of the above metal elements are preferred. Examples of preferred oxides that can be given, are ZnO and MgO. Examples of preferred hydroxides that can be given, are $Zn(OH)_2$, $Mg(OH)_2$, and the like. Examples of preferred aliphatic carboxylates that can be given, are zinc stearate and magnesium stearate. Examples of preferred acetates that can be given, are zinc acetate and magnesium acetate can be given.

The compound (C) has the effect of allowing the polyphenylene ether resin (A) and the liquid crystal polyester (B), which originally exhibit low miscibility, to partially be compatible, whereby ultrasonic cleaning resistance, particulate contamination properties, and repeated removability tend to be improved. As the compound (C), ZnO and $Mg(OH)_2$ are preferable from the viewpoint of partial compatibility. In particular, ZnO is preferable from the viewpoint of ionic contamination properties. The compound (C) may contain impurities to such an extent that the effects of the present invention are not impaired.

In the present invention, the polyphenylene ether resin (A) is used in an amount of preferably 30 parts by mass or more, more preferably 50 parts by mass or more, still more preferably 60 parts by mass or more, even more preferably 70 parts by mass or more, and particularly preferably 80 parts by mass or more based on 100 parts by mass of the total components from the viewpoint of particulate contamination properties, ultrasonic cleaning resistance, and water absorption.

In the present invention, when the total amount of components (A) and (B) is 100 parts by mass, the polyphenylene ether resin (A) is used in an amount of 51 parts by mass or more from the viewpoint of specific gravity, repeated removability, and cost and 99.5 parts by mass or less from the viewpoint of flowability and mold-releasability. The polyphenylene ether resin (A) is used in an amount of preferably 60 to 98 parts by mass, more preferably 70 to 96 parts by mass, and still more preferably 80 to 95 parts by mass.

In the present invention, when the total amount of components (A) and (B) is 100 parts by mass, the liquid crystal polyester (B) is used in an amount of 49 parts by mass or less from the viewpoint of specific gravity, repeated removability, and cost and 0.5 parts by mass or more from the viewpoint of flowability and mold-releasability. The liquid crystal polyester (B) is used in an amount of preferably 2 to 40 parts by mass, more preferably 4 to 30 parts by mass, and still more preferably 5 to 20 parts by mass.

In the present invention, when the total amount of components (A) and (B) is 100 parts by mass, the component (C) is used in an amount of 0.1 parts by mass or more from the viewpoint of ultrasonic cleaning resistance, particulate contamination properties, and repeated removability of the hard disk drive inner part and 10 parts by mass or less from the viewpoint of specific gravity and heat resistance of the composition. The component (C) is used in an amount of preferably 0.2 to 5 parts by mass, and more preferably 0.4 to 3 parts by mass for 100 parts by mass.

In the present invention, an inorganic filler may be added to the resin composition to such an extent that the features and the effects of the present invention are not impaired. Examples of strength improving agents that can be given, are inorganic compounds such as glass fibers, metal fibers, potassium titanate, carbon fibers, silicon carbide, ceramic, silicon nitride, mica, nephelinite, talc, wollastonite, slag fibers, ferrite, glass beads, glass powder, glass balloon, quartz, quartz glass, fused silica, titanium oxide, and calcium carbonate. The shape of the inorganic filler is not particularly limited. For example, a fibrous, plate-shaped, or spherical inorganic filler may be appropriately selected.

These inorganic fillers may be used in combination of two or more. The inorganic filler may be used after pretreatment with a silane, titanium, or another coupling agent.

Other additional components such as an antioxidant, a flame retardant (organic phosphate compound and phosphazene compound), an elastomer (olefin copolymer such as ethylene/propylene copolymer, ethylene/1-butene copolymer, ethylene/propylene/nonconjugated diene copolymer, ethylene/ethyl acrylate copolymer, ethylene/glycidyl methacrylate copolymer, ethylene/vinyl acetate/glycidyl methacrylate copolymer, ethylene/propylene-g-maleic anhydride copolymer, and ABS, polyester polyether elastomer, polyester polyester elastomer, vinyl aromatic compound-conjugated diene compound block copolymer, and hydrogenated product of vinyl aromatic compound-conjugated diene compound block copolymer), a plasticizer (e.g. paraffin oil, low-molecular-weight polyethylene, epoxidized soybean oil, polyethylene glycol, and fatty acid ester), a flame retardant auxiliary agent, a weatherability (light-resistance) improver, and a coloring agent may be added to the resin composition in addition to the above components to such an extent that the features and the effects of the present invention are not impaired.

In the present invention, when mixing components (A), (B), and (C), the order of mixing is not particularly limited. It is preferable to mix the entire amount of the components by top feeding from the viewpoint of simplifying the process and improving the properties. When it is desired to prevent the inorganic filler from breaking due to mixing, the inorganic filler may be mixed by side feeding.

The resin composition according to the invention may be produced by various methods. For example, a melt-mixing method using a single-screw extruder, a twin-screw extruder, a roller, a kneader, a Brabender plastograph, a Banbury mixer, or the like can be used. In particular, a melt-mixing method using a twin-screw extruder is most preferred. The melt-mixing temperature is not particularly limited. The melt-mixing temperature may be appropriately selected in the range of usually 200 to 350° C.

In the production method according to the present invention, a method of increasing the degree of vacuum during production by means of thorough ventilation, a method of increasing the resin temperature during extrusion, a method of increasing the rotational speed, a method of decreasing the amount of discharge, a method of reducing the amount of residual polymerization solvent in the polyphenylene ether contained in the raw material (e.g. enhancement of drying step), or the like may be employed in order to improve the outgassing properties of the resulting hard disk drive inner part. In particular, the following production method is more suitable from the viewpoint of reducing the amount of outgassing components in the resin composition.

The production method according to the present invention is a method of producing a resin composition which is a raw material for a hard disk drive inner part in order to improve outgassing properties of the hard disk drive inner part which comprises:

melt-mixing in a mixing zone at least one or more components selected from (A) a polyphenylene ether resin, (B) a liquid crystal polyester, and (C) a compound containing Zn and/or Mg using an extruder, at least one or more vents being mounted in the mixing zone;

volatile components are removed through the vent in a first stage at a degree of vacuum of −40 kPa or less; and, an oxygen concentration is adjusted to 5% or less by injecting an inert gas through a feed port.

Components other than components (A), (B), and (C) may also be melt-mixed in the same manner as described above. It is preferable that the vent pressure in the first stage be as low as possible. The vent pressure in the first stage is preferably −60 kPa or less, more preferably −80 kPa or less, and still more preferably −100 kPa or less. When a large amount of polymerization solvent is contained in the raw material (particularly polyphenylene ether), two or more vents may be mounted, or the degree of vacuum may be appropriately adjusted in order to prevent a vent-up phenomenon.

From the viewpoint of particulate contamination properties and repeated removability of the resulting hard disk drive inner part, it is preferable to adjust the oxygen concentration to 5% or less, more preferably 3% or less, and still more preferably 1% or less by injecting an inert gas through the feed port and measuring the oxygen concentration in a portion at a distance of about 7 cm from the screw of the extruder irrespective of top feeding and side feeding. Specific examples of an inert gas that can be given, are nitrogen, argon, helium, and the like. It is preferable to use nitrogen from the viewpoint of cost.

It is preferable to use an extruder with a barrel inner diameter of 46 mm or more from the viewpoint of low ionic contamination properties of the resulting hard disk inner part. The L/D ratio of the extruder is preferably 30 to 100, more preferably 40 to 80, and still more preferably 50 to 70. If the L/D ratio is too small, low ionic contamination properties tend to deteriorate. If the L/D ratio is too large, productivity decreases. Note that L is the length of the screw of the extruder, and D is the inner diameter of the barrel of the extruder. The L/D ratio is the ratio of the length of the screw of the extruder to the inner diameter of the barrel of the extruder. The low ionic contamination properties are very important properties for hard disk drive inner parts. If the low ionic contamination properties deteriorate, ions eluted from the resin accumulate at the end of the magnetic head or the disk, whereby a malfunction or a shortening of product life may occur.

The hard disk drive inner part according to the present invention may be formed by molding the above-described resin composition using various known methods such as injection molding, extrusion molding, and blow molding. It is preferable to mold the resin composition by injection molding. In particular, the resin composition is injection-molded at a mold temperature of 130° C. or more and a resin temperature of 350° C. or less. The mold temperature is preferably 130° C. or more, more preferably 150° C. or more, and still more preferably 160° C. or more from the viewpoint of mold-transfer properties and ultrasonic cleaning resistance. The upper limit of the mold temperature is preferably 210° C. or less. The resin temperature may vary in the range of about 0 to 20° C. with respect to the cylinder temperature depending on the molding conditions. In the case of injection molding, the resin temperature refers to the temperature of a resin injected from the tip of the nozzle, which is measured using a thermometer by removing the nozzle from the mold after conducting injection molding and discharging the resin from the tip of the nozzle in the same molding cycle and injection speed as employed during molding. The resin temperature is 350° C. or less, preferably 340° C. or less, more preferably 335° C. or less, and still more preferably 330° C. or less from the viewpoint of low outgassing properties and repeated removability.

The hard disk drive inner part according to the present invention thus obtained exhibits excellent low outgassing properties and shows well-balanced low outgassing properties, ultrasonic cleaning resistance, low ionic contamination properties, low particulate contamination properties, repeated removability, heat resistance, specific gravity, and water-absorbing properties. The low outgassing properties, ultrasonic cleaning resistance, low ionic contamination properties, and particulate contamination properties affect the cleanliness inside the hard disk drive, and are very important properties for ensuring the life and reliability of the product. Regarding the repeated removability, when the hard disk drive malfunctions, the hard disk drive may be disassembled and the parts may be recycled. For example, a hook as a hard disk drive inner part is required to be removable from the other material a number of times.

EXAMPLES

The present invention is described below by way of examples. The present invention is not limited to the following examples without departing from the scope of the present invention.

Production Example 1

Production Example of Polyphenylene Ether (PPE-1)

After subjecting 2,6-dimethylphenol to oxidation polymerization in a toluene solvent in the presence of a catalyst, the polymer was precipitated by adding methanol and collected by filtration. The polymer was dried at about −0.1 MPa for about seven hours using a vacuum dryer (VOS-601SD manufactured by Tokyo Rikakikai Co, Ltd.) set at 140° C. to obtain a poly(2,6-dimethyl-1,4-phenylene ether) powder. The reduced viscosity (0.5 g/dl, chloroform solution, measured at 30° C.) of the powder was 0.41, and the residual volatile content was about 1700 ppm.

Production Example 2

Production Example of Polyphenylene Ether (PPE-2)

After subjecting 2,6-dimethylphenol to oxidation polymerization in a toluene solvent in the presence of a catalyst, the polymer was precipitated by adding methanol and collected by filtration. The polymer was dried at about −0.1 MPa for about two hours using a vacuum dryer (VOS-601SD manufactured by Tokyo Rikakikai Co, Ltd.) set at 140° C. to obtain a poly(2,6-dimethyl-1,4-phenylene ether) powder. The reduced viscosity (0.5 g/dl, chloroform solution, measured at 30° C.) of the powder was 0.41, and the residual volatile content was about 19,000 ppm.

Production Example 3

Production Example of Liquid Crystal Polyester (LCP-1)

p-Hydroxybenzoic acid, 2-hydroxy-6-naphthoic acid, and acetic anhydride were melted by heating and polycondensed in a nitrogen atmosphere to obtain liquid crystal polyester (LCP-1) having the following theoretical structural formula. The component ratio of the composition indicates the molar ratio.

[Formula 8]

k/l = 0.73/0.27

Each resin composition was injection-molded and the properties of the resulting molded product were evaluated according to the following methods.

(1) Molding

Figure 3:
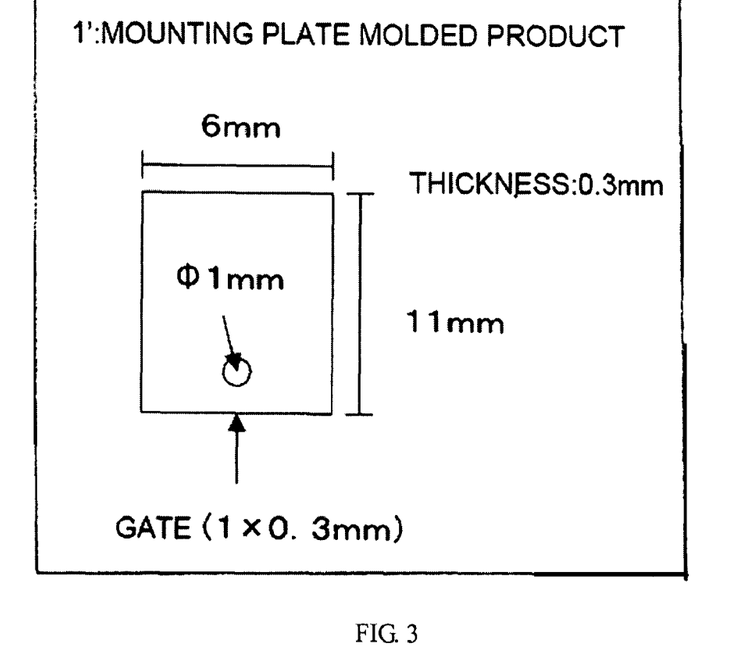
FIG. 3 is a schematic view of a mounting plate molded product.
Figure 4:
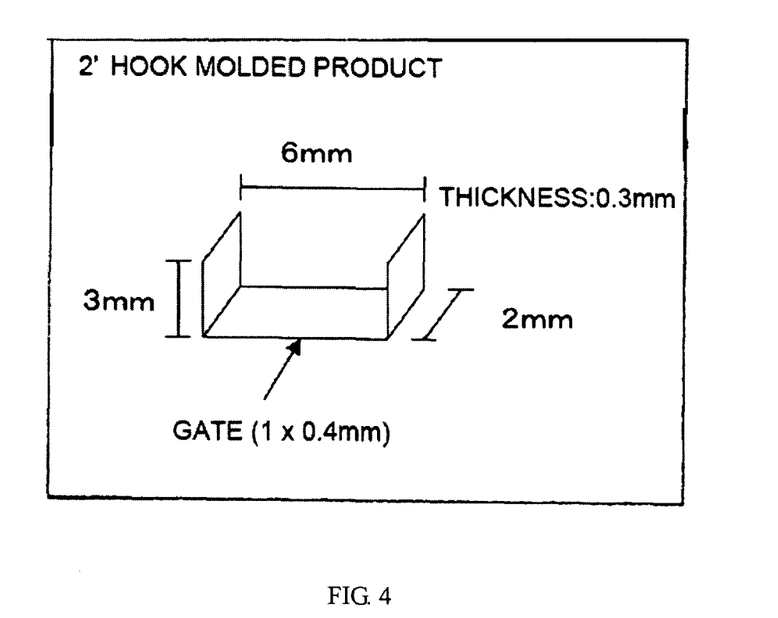
FIG. 4 is a schematic view of a hook molded product (1: mounting plate, 2: hook, 3: ramp, 4: mounting plate, 5: hook).

Pellets obtained by melt-mixing were injection-molded using an injection molding machine (EC60 manufactured by Toshiba Machine Co., Ltd.) at a cylinder temperature of 335° C., a mold temperature of 150° C., an injection speed of 300 mm/sec (maximum injection pressure: 260 MPa), and a holding pressure of 250 MPa (0.2 sec)/200 MPa (1.0 sec). A mounting plate molded product (FIG. 3, approximately 6 mm×11 mm×0.3 mm) and a hook molded product (FIG. 4, approximately 6 mm×2 mm×3 mm) were molded as hard disk drive inner parts.

(2) Low Outgassing Properties

The total amount of outgassing from the mounting plate molded product obtained in (1) during thermal extraction at 85° C. for three hours was measured using a high-resolution GC-MS chromatography system (GC/MS 5973 manufactured by Hewlett Packard, column: HP-5MS). The average value of three (n=3) molded products was calculated. The presence or absence of components which may affect recording of a hard disk drive (silicon, sulfur, halogen, and amino compound, hereinafter called "undesired components") was examined from the results and assignment of each GC-MS. The low outgassing properties were evaluated based on the following criteria. The low outgassing properties of the hook molded product obtained in (1) were evaluated in the same manner as described above.

Good: The total amount of outgassing was less than 500 ng per molded product, and undesired components were not detected.

Fair: The total amount of outgassing was 500 ng or more and less than 3000 ng per molded product, and undesired components were not detected, or the total amount of outgassing was less than 500 ng per molded product, and some undesired components were detected.

Bad: The total amount of outgassing was 3000 ng or more per molded product, or the total amount of outgassing was 500 ng or more and less than 3000 ng per molded product, and some undesired components were detected.

(3) Ultrasonic Cleaning Resistance

The mounting plate molded product obtained in (1) was subjected to ultrasonic cleaning (28 kHz) using a surfactant aqueous solution, washed with pure water (five sequential batches), and dried at 65° C. under vacuum. The surface state of the molded product was then observed using a stereoscopic microscope at a magnification of 40 to observe the presence or absence of fluffiness on the surface. The ultrasonic cleaning resistance was evaluated based on the following criteria. Three (n=3) molded products were evaluated.

Good: Fluffiness and peeling of the surface were not observed for the three molded products.

Fair: Fluffiness and peeling of the surface were observed for one or two molded products.

Bad: Fluffiness and peeling of the surface were observed for the three molded products.

(4) Particulate Contamination Properties

The number of fine particles or foreign materials on the surface of the mounting plate molded product washed and dried in (3) was measured using an image analysis system (microscope: Nikon E600L, camera: Sony XC-003, image processing software: Nireco LUZEX SE). The number of foreign materials with a size of 1 micrometer or more in a 2 mm×2 mm area was measured and converted into the number of foreign materials per square centimeter. The average value of two (n=2) molded products was calculated, and the particulate contamination properties were evaluated based on the following criteria.

Good: The number of foreign materials was less than 1000 per square centimeter.

Fair: The number of foreign materials was 1000 or more and less than 5000 per square centimeter.

Bad: The number of foreign materials was 5000 or more per square centimeter.

(5) Repeated Removability

A mounting plate and a stainless steel plate were secured using the hook molded product obtained in (1), and the hook molded product was then removed. The removal operation was repeatedly performed three times. The surface state of the bent portion of the hook was observed after each removal operation. The repeated removability was evaluated based on the following criteria.

Good: No trouble was observed in the bent portion after three removal operations.

Fair: Cracks occurred in the bent portion after third removal operations.

Bad: Cracks occurred in the bent portion after the first or second removal operation, or breakage was observed after the first, second, or third removal operation.

(6) Low Ionic Contamination Properties

The hook molded product obtained in (1) was subjected to ultrasonic cleaning and dried in the same manner as in (3). 1 g (corresponding to 100 to 150 products) of the molded products were weighed and placed in a plastic bottle. After the addition of 5 ml of pure water, the plastic bottle was capped and placed in a thermostat bath at 75° C. for 30 minutes. After cooling the molded products, the supernatant liquid was taken out and subjected to quantitative determination of the amount of ammonium ions ($NH_4^+$) dissolved in water by ion chromatography. The unit for the amount of ammonium ions is microgram/ml.

(7) Heat Resistance (DTUL)

The pellets obtained were molded using an injection molding machine (IS-80EPN manufactured by Toshiba Machine Co., Ltd.) at a cylinder temperature of 330/330/320/310° C., an injection speed of 85%, and a mold temperature of 130° C. to obtain an ASTM strip specimen with a thickness of 3.2 mm, a length of 127 mm, and a width of 12.7 mm. The deflection temperature of the resulting specimen under a load of 1.82 MPa was measured in accordance with ASTM D648.

(8) Specific Gravity

The ASTM strip specimen with a thickness of 3.2 mm, a length of 127 mm, and a width of 12.7 mm obtained in (7) was cut, and the specific gravity of the cut specimen at 23° C. was measured using an electronic densimeter (ED-120T, Mirage Trading Co., Ltd.). The specific gravity is preferably small.

(9) Water Absorption

The ASTM strip specimen with a thickness of 3.2 mm, a length of 127 mm, and a width of 12.7 mm obtained in (7) was cut, and the water absorption of the cut specimen after storage at 23° C. and 50% RH for 24 hours was measured in accordance with ASTM D570. The water absorption is preferably small.

(10) Residual Volatile Content Analysis

Pellets obtained in the following examples and comparative examples were dissolved in chloroform, and subjected to measurement of the residual volatile content using a gas chromatography system (GC2010 manufactured by Shimadzu Corporation, internal standard: mesitylene, column: ULBON HR-1 manufactured by Shinwa Chemical Industries Ltd.). The measurement was conducted under conditions of holding at a column temperature 50° C. for five minutes, increasing the temperature to 200° C. at 50° C./min, and holding for one minute. In the examples and the comparative examples, toluene and a styrene monomer (decomposed product derived from polystyrene resin) were quantitatively determined as the residual volatile components.

Example 1

Polyphenylene ether (PPE-1), atactic polystyrene (GP, 685, manufactured by PS Japan Corporation), and a hydrogenated product of a vinyl aromatic compound-conjugated diene compound block copolymer (SEBS, Tuftec H1041 (registered trademark) manufactured by Asahi Kasei Chemicals Corporation) were mixed at a ratio (part by mass) shown in Table 1. The components were supplied to a twin-screw extruder (ZSK-40SC; manufactured by Werner & Pfleiderer (D: barrel inner diameter)=40 mm, L/D=(L: screw length)/(barrel inner diameter)=47) by top feeding (only the zone under the top hopper was set at 250° C., the zones 2 to 7 were set at 290° C., the die head was set at 320° C., and one vent was provided), and melt-mixed at a rotational speed of 300 rpm and an amount of discharge of 60 kg/hr to obtain pellets. The vent gauge pressure is shown in Table 1. The residual volatile content in the pellet was measured in accordance with (9). The results are shown in Table 1. Nitrogen was injected through the top feed port at 30 L/hr, and the oxygen concentration at a portion 7 cm right above the screw was measured and found to be 2%. The pellets were molded using the method described in (1) to obtain a hard disk drive inner part. The resin temperature was 335° C., which was almost the same as the cylinder temperature. A test piece was molded using the method described in (7). The hard disk drive inner part and the test piece were evaluated in accordance with the above methods. The evaluation results are shown in Table 1. The total amount of outgassing was 309 ng per molded product. The releasability of the molded product from the mold was very good.

Example 2

The same operations as in Example 1 were conducted except that polyphenylene ether (PPE-1), a liquid crystal polyester (LCP-1), and zinc oxide (ZnO, Ginrei (registered trademark) manufactured by Toho Zinc Co., Ltd.) were mixed at a ratio (part by mass) shown in Table 1. The oxygen concentration was 2%. The resin temperature when molding the hard disk drive inner part was 335° C., which was the same as the cylinder temperature. The evaluation results are shown in Table 1. The total amount of outgassing was 210 ng per molded product. The releasability of the molded product from the mold was very good.

When molding a mounting plate molded product using the method described in (1), the molded product could not be obtained due to a short shot when setting the mold temperature at 90° C.

Example 3

The same operations as in Example 1 were conducted except that polyphenylene ether (PPE-2), the liquid crystal polyester (LCP-1), and zinc oxide (ZnO, Ginrei (registered trademark) manufactured by Toho Zinc Co., Ltd.) were mixed at a ratio (part by mass) shown in Table 1, mounting vents at two locations of the extruder, and setting the vent in the first stage at −80 kPa and the vent in the second stage at −60 kPa. The oxygen concentration was 1%. The resin temperature when molding the hard disk drive inner part was 335° C., which was the same as the cylinder temperature. The evaluation results are shown in Table 1. The total amount of outgassing from the mounting plate was 312 ng per molded product, and undesired components were not detected. The releasability of the molded product from the mold was very good.

Example 4

The same operations as in Example 3 were conducted except that the vent in the first stage was set at −50 kPa and the vent in the second stage was set at −70 kPa. The oxygen concentration was 1%. The resin temperature when molding the hard disk drive inner part was 335° C., which was the same as the cylinder temperature. The evaluation results are shown in Table 1. The total amount of outgassing from the mounting plate was 610 ng per molded product, and undesired components were not detected. The releasability of the molded product from the mold was very good.

Example 5

The same operations as in Example 2 were conducted except that the components were mixed at a ratio (part by mass) shown in Table 1. The oxygen concentration was 2%. The resin temperature during molding was 335° C. The evaluation results are shown in Table 1. The releasability of the molded product from the mold was very good.

Comparative Example 1

The same molding and evaluation operations as in Example 1 were conducted except that a polyetherimide (PEI, Ultem 1000 (registered trademark), manufactured by GE) was molded using the molding machines given in (1) and (7) at a cylinder temperature of 410° C. When removing the hard disk drive inner part molded product from the mold, releasably from the mold was poor in some cases. The evaluation results are shown in Table 1. In the measurement of the amount of outgassing from the mounting plate, silicon was detected. The specific gravity and the water absorption were greater than those of the examples.

Comparative Example 2

The same molding and evaluation operations as in Example 1 were conducted except that a polycarbonate resin (PC, Panlite L-1250Y (registered trademark) manufactured by Teijin Chemicals Ltd.) was molded using the molding machines given in (1) and (7) at a cylinder temperature of 300° C. and a mold temperature of 120° C. When removing the hard disk drive inner part molded product from the mold, releasably from the mold was poor in some cases. The evaluation results are shown in Table 1. In the measurement of the amount of outgassing from the mounting plate, chlorine was detected. The specific gravity was relatively greater and the water absorption was greater than those of the examples.

Comparative Example 3

Components were compounded in the same manner as in Example 1 except that a polyphenylene sulfide resin (PPS, Torelina A900 (registered trademark) manufactured by Toray Industries Inc.) and a hydrogenated product of a vinyl aromatic compound-conjugated diene compound block copolymer (SEBS, Tuftec H1041 (registered trademark) manufactured by Asahi Kasei Chemicals Corporation) were mixed at a ratio (part by mass) shown in Table 1, and the temperature of the extruder was set at 310° C. The mixture was molded in the same manner as in Example 1 using the molding machines given in (1) and (7) except for setting the cylinder temperature at 330° C. and the mold temperature at 120° C., and the resulting products were evaluated. The evaluation results are shown in Table 1. In the measurement of the amount of outgassing from the mounting plate molded product and the hook molded product, sulfur was detected. The specific gravity was greater than those of the examples. The molded product exhibited poor repeated removability due to fragility.

Example 6

The same operations as in Example 3 were conducted except that the vent of the extruder in the first stage was set at −20 kPa and the vent in the second stage was set at −40 kPa. The oxygen concentration was 1%. The resin temperature when molding the hard disk drive inner part was 335° C., which was the same as the cylinder temperature. The evaluation results are shown in Table 1. The total amount of outgassing from the mounting plate was 1540 ng per molded product, and undesired components were not detected. The total amount of outgassing from the hook was 890 ng per molded product.

Example 7

The same operations as in Example 5 were conducted except that the components were mixed at a ratio (part by mass) shown in Table 1. The oxygen concentration was 2%. The resin temperature during molding was 335° C. The evaluation results are shown in Table 1. Peeling was observed on the surface of only one molded product after ultrasonic cleaning. The evaluation results of particulate contamination properties and repeated removability were "Fair".

Example 8

The same operations as in Example 1 were conducted using the same raw materials at the same ratio except for changing the extruder. Specifically, the components were supplied to a twin-screw extruder (TEM-58SS; manufactured by Toshiba Machine Co., Ltd. (D: barrel inner diameter)=54 mm, L/D=(L: screw length)/(barrel inner diameter)=58) by top feeding (only the zone under the top hopper was set at 250° C., the zones 2 to 13 were set at 290° C., the die head was set at 320° C., and two vents were mounted), and melt-mixed at a rotational speed of 300 rpm and an amount of discharge of 210 kg/hr to obtain pellets. The residual volatile content in the pellet was measured in accordance with (10). The results are shown in Table 1. Nitrogen was injected through the top feed port at 40 L/hr, and the oxygen concentration at a portion 7 cm right above the screw was measured and found to be 2%. The pellets were molded using the method described in (1) to obtain a hard disk drive inner part. The resin temperature was 335° C., which was almost the same as the cylinder temperature. A test piece was molded using the method described in (7). The hard disk drive inner part and the test piece were evaluated in accordance with the above methods. The evaluation results are shown in Table 1. The total amount of outgassing from the mounting plate molded product was 225 ng per molded product. The releasability of the molded product from the mold was very good. It was found that the low ionic contamination properties are affected by the size of the extruder from comparison with Example 1.

Example 9

The same raw materials at the same ratio as in Example 2 were melt-mixed in the same manner as in Example 8 to obtain pellets. The total amount of outgassing from the mounting plate molded product was 256 ng per molded product. It was found that the low ionic contamination properties are affected by the size of the extruder from comparison with Example 2.

Example 10

The same operations as in Example 3 were conducted except for mounting an open vent in the first stage and completely closing the vent port in the second stage. The total amount of outgassing from the mounting plate molded product was 3250 ng per molded product. As is clear from a comparison of Examples 3, 4, and 10, it was found that the low outgassing properties, repeated removability, and low ionic contamination properties are affected by the degree of ventilation during melt-mixing the composition using the extruder.

TABLE 1

| | | | Example 1 | Example 2 | Example 3 | Example 4 | Example 5 | Comparative Example 1 | Comparative Example 2 | Comparative Example 3 | Example 6 | Example 7 | Example 8 | Example 9 | Example 10 |
|---|---|---|---|---|---|---|---|---|---|---|---|---|---|---|---|
| Composition | (A) | PPE-1 | 85 | 95 | | | 51 | | | | | 45 | 85 | 95 | |
| | | PPE-2 | | | 94 | 94 | | | | | 94 | | | | 94 |
| | | GP | 15 | | | | | | | | | 15 | | | |
| | (B) LCP-1 | | | 5 | 6 | 6 | 49 | | | | 6 | 55 | | 5 | 6 |
| | (C) ZnO | | | 08 | 0.8 | 0.8 | 1.5 | | | | 0.8 | 1.5 | | 0.8 | 0.8 |
| | SEBS | | 3 | | | | | | | 3 | | | 3 | | |
| | PEI | | | | | | | 100 | | | | | | | |
| | PC | | | | | | | | 100 | | | | | | |
| | PPS | | | | | | | | | 97 | | | | | |
| Vent (kPa) | | | −94 | −99 | −80/−60 | −50/−70 | −100 | — | — | −94 | −20/−40 | −93 | −85/−92 | −85/−92 | — |
| Residual volatile content (ppm) | Toluene | | 213 | 76 | 412 | 723 | 311 | — | — | — | 2890 | 315 | 224 | 112 | 8700 |
| | Styrene | | 116 | 0 | 0 | 0 | 0 | — | — | — | 0 | 0 | 106 | 0 | 0 |
| | Total | | 329 | 76 | 412 | 723 | 311 | — | — | — | 2890 | 315 | 330 | 112 | 8700 |
| Evaluation | Low outgassing | Mounting plate | Good | Good | Good | Good | Good | Fair | Fair | Fair | Fair | Good | Good | Good | Bad |
| | | hook | Good | Good | Good | Good | Good | Fair | Fair | Fair | Fair | Good | Good | Good | Bad |
| | Ultrasonic cleaning resistance | | Good | Good | Good | Good | Good | Good | Good | Good | Good | Fair | Good | Good | Good |
| | Particulate contamination | | Good | Good | Good | Good | Fair | Good | Good | Good | Good | Fair | Good | Good | Good |
| | Repeated removability | | Good | Good | Good | Good | Fair | Good | Good | Bad | Fair | Fair | Good | Good | Fair |
| | Low ionic contamination | | 0.12 | 0.11 | 0.23 | 0.35 | 0.22 | — | — | — | 0.61 | 0.22 | <0.05 | <0.05 | 0.86 |
| | Heat resistance | | 161 | 180 | 178 | 178 | 179 | 200 | 135 | 106 | 172 | 178 | 161 | 180 | 170 |
| | Specific gravity | | 1.05 | 1.05 | 1.06 | 1.06 | 1.22 | 1.27 | 1.20 | 1.34 | 1.05 | 1.25 | 1.05 | 1.05 | 1.05 |
| | Water-absorbing properties | | 0.06 | 0.06 | 0.06 | 0.06 | 0.08 | 0.25 | 0.15 | 0.02 | 0.06 | 0.10 | 0.06 | 0.06 | 0.06 |

The above results confirm that a hard disk drive inner part obtained by molding a resin composition including the polyphenylene ether resin (A) exhibits well-balanced low outgassing properties, ultrasonic cleaning resistance, low ionic contamination properties, low particulate contamination properties, repeated removability, heat resistance, specific gravity, and water-absorbing properties.

Example 11

The same operations as in Example 2 were conducted except for setting the flow rate of nitrogen gas through the feed port at zero when melt-mixing the components using the extruder and melt-mixing the components in air. The oxygen concentration was 21%. The total amounts of outgassing from the mounting plate molded product and the hook molded product were respectively 2850 ng and 4100 ng per molded product. The evaluation results of ultrasonic cleaning resistance, particulate contamination properties, and repeated removability were "Fair".

Example 12

The same operations as in Example 2 were conducted except for adjusting the oxygen concentration at the feed port of the extruder to 6%. The evaluation results of low outgassing properties of the mounting plate and the hook were "Good". The evaluation results of ultrasonic cleaning resistance, particulate contamination properties, and repeated removability were "Fair".

As is clear from a comparison of Examples 2, 11 and 12, it was found that the low outgassing properties, ultrasonic cleaning resistance, particulate contamination properties, and repeated removability are affected by the oxygen concentration.

Example 13

A mounting plate molded product was obtained in the same manner as in Example 2 using the pellets obtained in Example 2 except for setting the cylinder temperature of the molding machine used in (1) at 360° C. The resin temperature measured during purging was 362° C. A large amount of gas considered to be produced due to decomposition of the polymer was produced during molding. The total amounts of outgassing from the mounting plate and the hook were respectively 4500 ng and 3600 ng per molded product. The evaluation results of ultrasonic cleaning resistance and particulate contamination properties were "Bad". The evaluation result of repeated removability was "Fair".

As is clear from a comparison with Example 2, it was found that the low outgassing properties, ultrasonic cleaning resistance, and particulate contamination properties are affected by the resin temperature during molding.

INDUSTRIAL APPLICABILITY

The hard disk drive inner part according to the present invention formed of the polyphenylene ether resin exhibits well-balanced low outgassing properties, ultrasonic cleaning resistance, low ionic contamination properties, low particulate contamination properties, repeated removability, heat resistance, specific gravity, and water-absorbing properties. A hard disk drive has been reduced in size and increased in capacity along with widespread use of digital home appliances. An inner part of the hard disk drive is strongly required to have low outgassing properties, cleanliness, and a reduced weight in order to reduce the size of the hard disk drive. Therefore, the present invention can provide a highly-reliable hard disk drive inner part which exhibits excellent low outgassing properties, cleanliness, reduced weight, and low water absorption and deals with the above trend. Accordingly, the present invention has an extremely high industrial value.

BRIEF DESCRIPTION OF THE DRAWINGS

In FIG. 1, a mounting plate (1), a hook (2), and a ramp (3) are illustrated as typical hard disk drive inner parts.

The invention claimed is:

1. A hard disk drive inner part comprising a hard disk drive inner part formed of a resin composition which comprises from 51 to 99.5 parts by mass of a polyphenylene ether resin (A), from 0.5 to 49 parts by mass of a liquid crystal polyester (B) and from 0.1 to 10 parts by mass of a compound (C) containing Zn and/or Mg based on 100 parts by mass of components (A) and (B) in total.

2. The hard disk drive inner part according to claim 1, wherein the resin composition contains residual volatile components including a polyphenylene ether polymerization solvent and/or a styrene monomer in an amount of less than 3000 ppm.

3. The hard disk drive inner part according to claim 1, wherein the hard disk drive inner part includes a removable portion.

4. The hard disk drive inner part according to claim 2, wherein the hard disk drive inner part includes a removable portion.

5. The hard disk drive inner part according to claim 1, wherein the hard disk drive inner part is a mounting plate or a hook.

6. A resin composition for hard disk drive inner parts comprising from 51 to 99.5 parts by mass of a polyphenylene ether resin (A), from 0.5 to 49 parts by mass of a liquid crystal polyester (B) and from 0.1 to 10 parts by mass of a compound (C) containing Zn and/or Mg based on 100 parts by mass of components (A) and (B) in total.

7. The resin composition according to claim 6, wherein the resin composition contains residual volatile components including a polyphenylene ether polymerization solvent and/or a styrene monomer in an amount of less than 3000 ppm.

8. A method for producing a resin composition as a raw material for hard disk drive inner parts, the method comprising:
melt-mixing in a mixing zone at least one or more components selected from (A) a polyphenylene ether resin, (B) a liquid crystal polyester, and (C) a compound containing Zn and/or Mg using an extruder, at least one or more vents being provided in the mixing zone;
removing volatile components through the vent in a first stage at a degree of vacuum of −40 kPa or less; and,
adjusting an oxygen concentration to 5% or less by injecting an inert gas through a feed port.

9. The method according to claim 8, wherein the extruder has a barrel inner diameter of 46 mm or more.

10. The method according to claim 9, wherein the extruder has an L/D ratio (L: length of a screw of the extruder, D: inner diameter of a barrel of the extruder) of 30 to 100.

11. A hard disk drive inner part obtained by molding a resin composition produced by the method according to claim 8.

12. A hard disk drive inner part obtained by molding a resin composition produced by the method according to claim 9.

13. A hard disk drive inner part obtained by molding a resin composition produced by the method according to claim 10.

14. A method of molding a hard disk drive inner part comprising injection-molding the resin composition according to claim 6 at a mold temperature of 130° C. or more and a resin temperature of 350° C. or less.

15. A hard disk drive inner part obtained by the method according to claim 14.

* * * * *